(12) United States Patent
Shishov et al.

(10) Patent No.: US 8,500,836 B2
(45) Date of Patent: Aug. 6, 2013

(54) CENTRIFUGAL SEPARATOR FOR SEPARATING LIQUID PARTICLES FROM A GAS FLOW

(75) Inventors: Andrey Vladimirovich Shishov, Zheleznodorozhny (RU); Aleksander Petrovich Skibin, Moscow (RU); Daria Aleksandrovna Mustafina, Perm (RU); Victor Evgenievich Petrov, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 219 days.

(21) Appl. No.: 12/745,412

(22) PCT Filed: Dec. 25, 2008

(86) PCT No.: PCT/RU2008/000800
§ 371 (c)(1),
(2), (4) Date: Dec. 1, 2010

(87) PCT Pub. No.: WO2009/070058
PCT Pub. Date: Jun. 4, 2009

(65) Prior Publication Data
US 2011/0078987 A1    Apr. 7, 2011

(30) Foreign Application Priority Data
Nov. 29, 2007   (RU) .................................. 2007143974

(51) Int. Cl.
*B01D 45/00* (2006.01)
(52) U.S. Cl.
USPC ................. 55/416; 55/447; 55/449; 55/458; 55/456; 55/410; 55/412; 55/414; 55/406; 55/407

(58) Field of Classification Search
USPC .................. 55/416, 447, 449, 458, 456, 410, 55/412, 414, 406, 407
See application file for complete search history.

(56) References Cited

U.S. PATENT DOCUMENTS
3,234,716 A * 2/1966 Sevin et al. ................ 210/360.1
3,815,339 A   6/1974 Meier et al.
(Continued)

FOREIGN PATENT DOCUMENTS
CA   2536773 A1   3/2005
CN   1082461 A    2/1994
(Continued)

*Primary Examiner* — Jason M Greene
*Assistant Examiner* — Dung H Bui

(57) ABSTRACT

A centrifugal separator for separating liquid droplets from a gas flow can be used for scrubbing gases to be emitted into the atmosphere, as well as for separating water, oil and gas condensate droplets from a gas flow in any industry. The separator comprises a cylindrical body with axial gas flow inlet and outlet pipes and separated liquid removal sections located on the end surfaces of the body. A swirler and a central perforated pipe are installed in series and in axial alignment in the body from the gas inlet side. A conical displacer is installed in the perforated central pipe. Separation stage vanes are located between the central pipe and the conical displacer along the entire length of the displacer, and hydraulic seal vanes are placed at the same level between the central pipe and the body. The separator design provides a more efficient separation of liquid droplets from a high-velocity gas flow and can operate in any position.

5 Claims, 1 Drawing Sheet

U.S. PATENT DOCUMENTS

| | | | |
|---|---|---|---|
| 5,130,082 A | 7/1992 | Oosterkamp | |
| 5,334,239 A | 8/1994 | Choe et al. | |
| 5,510,017 A | 4/1996 | Abdullayev | |
| 7,396,373 B2 * | 7/2008 | Lagerstedt et al. | 55/406 |
| 7,615,087 B2 * | 11/2009 | Marinella Pavlatos | 55/306 |
| 2007/0163215 A1 * | 7/2007 | Lagerstadt | 55/406 |

FOREIGN PATENT DOCUMENTS

| | | |
|---|---|---|
| RU | 2133136 C1 | 7/1999 |
| RU | 2177821 C1 | 1/2002 |
| RU | 2190450 C2 | 10/2002 |
| RU | 2236888 C1 | 9/2004 |

* cited by examiner

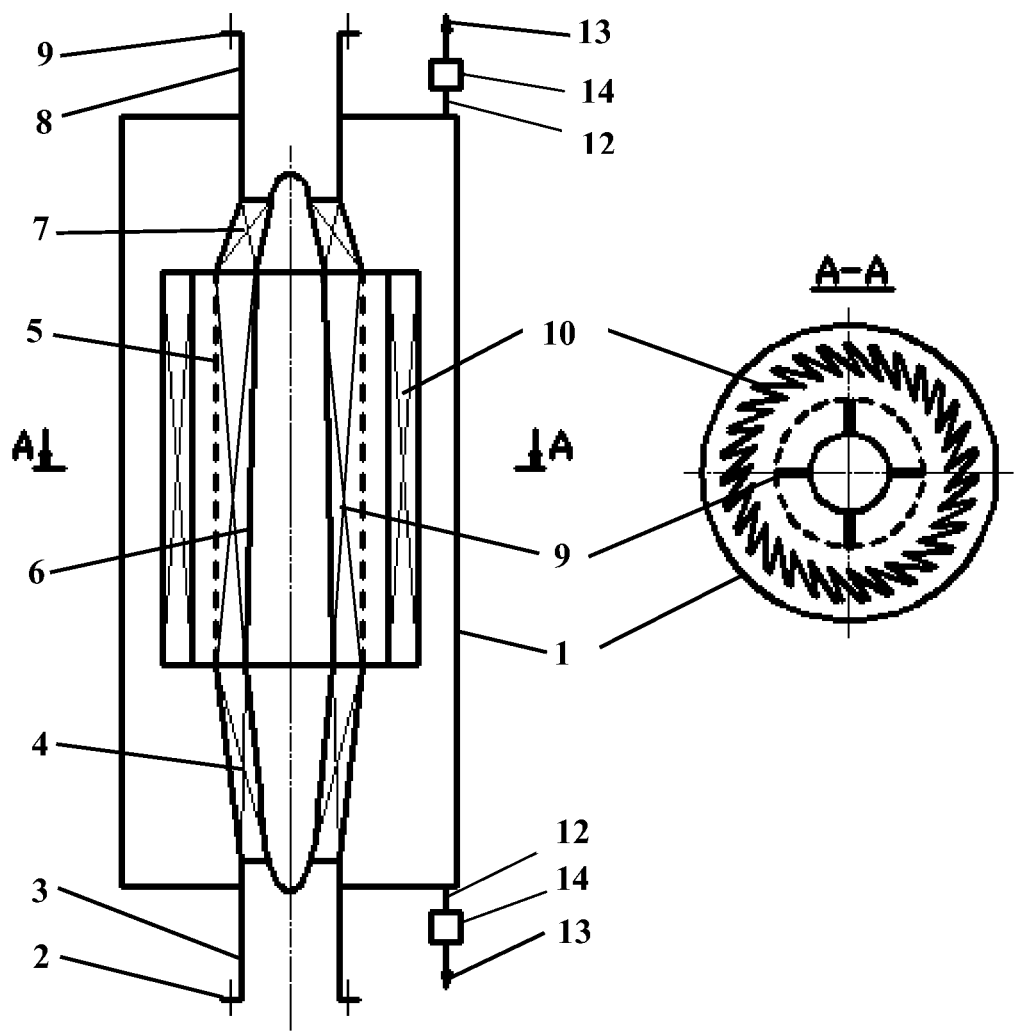

CENTRIFUGAL SEPARATOR FOR SEPARATING LIQUID PARTICLES FROM A GAS FLOW

The invention relates to devices used for separating condensed moisture from a gas flow, and can be used for scrubbing gases to be emitted into the atmosphere, as well as for separating water, oil and gas condensate droplets from a gas flow in any industry.

There is a known foam-vortex apparatus (DE, Patent 1471602) which is used for treating gases for liquid droplets and which comprises a body partially filled with liquid and equipped with gas and liquid inlet and outlet pipes. Along the center line of the body, there is a tube with a hollow cylinder installed in its bottom part at a space from the bottom of the apparatus. In the top part of the body, there are a vortex chamber and a separator located above the liquid bath.

The disadvantage of the known apparatus consists in a low gas treatment efficiency due to the apparatus design imperfection.

Also, there is a known centrifugal separator (SU, Inventor's Certificate 1611452) which comprises a covered body, a tangentially installed untreated gas inlet pipe, a transverse wall installed above the untreated gas inlet pipe and containing fixed vertical tubular direct-flow separating elements, with swirlers at the inlet and with a cooling system. Also, a treated gas outlet pipe is fixed in the body. The cooling system includes vertical heat pipes the evaporation zones of which (made in the form of axial fairing displacers) are located in the separating elements, while the finned condensation zones are brought out through the body cover.

The disadvantage of the known apparatus consists in a low gas treatment efficiency due to the apparatus design imperfection.

Also, there is a known gas-liquid separator (RU, Patent 2190450) which comprises a vertical cylindrical body, gas-liquid mixture inlet pipelines, gas and liquid outlet pipelines, drain pipes, and a wall dividing the separator into chambers. It is additionally equipped with a gas-equalizing pipeline which connects the separator body to the gas outlet pipeline. The wall in the separator body is made conical, and one of the chambers (the inlet one) is equipped with drain pipes and with a concentrically installed knock-out chamber with a swirler, the conical bottom part and drain pipes the bottom ends of which are located below the ends of the drain pipes of the inlet chamber and are installed in the hydraulic seal bowl in the bottom part of the body.

The disadvantage of the known apparatus consists in a low gas treatment efficiency due to the apparatus design imperfection.

Also, there is a known separator (U.S. Pat. No. 3,815,339) which is designed to remove moisture from a gas flow and which comprises a body with a separated liquid collector and an axial unseparated flow inlet pipe located in the bottom part of the body. In addition, the body contains a vane swirler with hollow vanes, a central pipe with the conical bottom which serves as the upper cover of the swirler. The bottom part of the conical bottom is connected by a connecting pipe to the separated liquid collector. Additionally, an annular pocket with a shut-off valve is located in the top part of the body.

Also, there is a known centrifugal separator (SU, Inventor's Certificate 827123) which comprises a body, a separated liquid collector and an axial unseparated flow inlet pipe located in the bottom part of the body, a vane swirler, and a central pipe with the conical bottom which serves as the upper cover of the swirler. It also has a separated liquid drain pipe. In the top part of the body, there is an annular pocket with a flow shut-off valve. Besides, the separator is additionally equipped with an annular deflector installed in the central pipe and with an additional vane swirler installed in the central pipe and connected by a connecting pipe to the top part of the annular channel, as well as with convergent nozzles which are connected to the flow shut-off valve and to the central pipe and are used for removing the treated flow.

Both known devices are based on the two-stage flow treatment principle. The centrifugal separation takes place at the first stage, and a portion of the gas undergoes additional inertial separation, when passing through the channels of the hollow vanes to the central pipe. The liquid separated during this process is sent to a common collector.

The disadvantage of both known devices consists in an insufficient gas/liquid separation efficiency.

The technical result achieved through the implementation of the invention consists in a more efficient separation of liquid droplets from a high-velocity gas flow.

A centrifugal separator for separating liquid droplets from a gas flow comprises a cylindrical body with axial gas flow inlet and outlet pipes and a separated liquid removal section located on the end surface of the body. A swirler and a central pipe are installed in series and in axial alignment in the body from the gas inlet side. A conical displacer is installed in the perforated central pipe. Separation stage vanes are located between the central pipe and the conical displacer along the entire length of the displacer, and hydraulic seal vanes are placed at the same level between the central pipe and the body. The separation stage vanes are made in the form of plates which spiral up in the direction of the flow.

The hydraulic seal vanes are made in the form of vertical plates bent round the radius and in the direction of the rotation of the main flow. The plate edges are joined tightly together from the central perforated pipe side, and are spaced apart from the body side.

A flow straightener can be installed downstream in the body, between the central pipe and the axial gas flow outlet pipe.

The separator may contain an additional separated liquid removal section located on the opposite end surface of the body.

The suggested centrifugal separator in its preferred embodiment is schematically shown in the drawing where the following symbols are used: body 1, inlet flange 2, gas flow inlet pipe 3, swirler 4, central perforated pipe 5, conical displacer 6, flow straightener 7, treated gas flow outlet pipe 8, outlet flange 9, hydraulic seal vanes 10, separation stage vanes 11, separated liquid removal section 12 and additional separated liquid removal section 13, throttling device 14.

In its preferred embodiment, the centrifugal separator for separating liquid droplets from a gas flow comprises the body 1 equipped with the axial gas flow inlet pipe 3 with the inlet flange 2. The swirler 4 installed in the axial alignment in the body 1 is connected to the pipe 3, and the central perforated pipe 5 is in turn connected to the swirler 4. The conical displacer 6 is installed in the central perforated pipe 5 and is surrounded by the separation stage vanes 11 along its entire length. The hydraulic seal vanes 10 are placed at the same level as the conical displacer 6, between the body 1 and the central perforated pipe 5, along the entire length of the displacer. The treated gas is removed by using the pipe 8 and the outlet flange 9. The flow straightener 7 can be installed downstream between the central pipe 5 and the pipe 8. The separated liquid is removed by using the section 12. The body 1 can be equipped with the additional separated liquid removal section 13 located on the opposite side of the body 1. The separated liquid removal sections 12 and 13 can be equipped with the throttling devices 14 the flow rates through which are selected in such a way as to suit the specified flow characteristics at the inlet of the separator.

The device works as follows. A gas flow containing a small amount of moisture in the form of water droplets or gas condensate droplets enters through the inlet flange 2 and the pipe 3 to the swirler 4 where it changes its flow pattern from the progressive motion along the pipe to the spiral rotation. In the swirler 4, the flow is divided into several independent parallel flows which further go in the channel formed by the conical displacer 6 from the inside and by the central perforated pipe 5 and the separation stage vanes 11 from the outside. The flow in a channel having such geometry is divergent by its nature. Here, moisture is pushed by inertial forces to the internal walls of the central pipe 5. The droplets then fall onto the internal surface of the wall of the body 1 and onto the external surface of the hydraulic seal vanes 10 through the holes made in the central perforated pipe 5 and through the gap between the hydraulic seal vanes 10. Here, they gather and flow down by gravity to the bottom part of the body 1 from where moisture is removed by purging through the separated liquid removal section 12. The separated liquid removal section 12 can be equipped by the throttling device 14 the flow rate through which is selected in such a way as to suit the specified flow characteristics at the inlet of the separator. The body 1 can be equipped with the additional separated liquid removal section 13 located on the opposite side of the body 1. Due to the availability of the additional section, the same separator can be used in any position. It is possible to install the flow straightener 7 downstream of the conical displacer 6 and upstream of the outlet pipe 8 to remove the flow swirling at the outlet of the separator.

The hydraulic seal vanes 10 are made in the form of vertical plates bent round the radius and in the direction of the rotation of the main flow. The plate edges are joined tightly together from the central perforated pipe side and have a slot-type gap from the body side, thus forming a hydrodynamic lock which prevents the moisture droplets from coming back out.

Such separate modules can be optimized for specific flow characteristics and can be installed in series to provide deep gas dehydration. On the other hand, it is possible to combine the modules optimized for slightly different inlet conditions into a single device operating in a sufficiently wide range of the medium parameters. Based on the suggested design, it is possible to develop a whole series of separating devices which can be installed on pipelines 30 to 1,500 mm in diameter.

The suggested design can operate both in vertical and horizontal positions, as well in the "upside-down" position or in any other intermediate position, which simplifies considerably the separator arrangement relative to other equipment. This is possible due to the fact that the centrifugal force arising during the flow swirling is several times greater than the force of gravity.

The invention claimed is:

1. A centrifugal separator for separating liquid droplets from a gas flow, comprising:
    a cylindrical body with axial gas flow inlet and outlet pipes;
    a first separated liquid removal section located on the end surface of the cylindrical body, with a swirler and a perforated central pipe installed in series and in axial alignment in the cylindrical body from the axial gas flow inlet side,
    a conical displacer installed in the perforated central pipe, with separation stage vanes located between the perforated central pipe and the conical displacer along the entire length of the conical displacer, and
    hydraulic seal vanes placed at the same level between the perforated central pipe and the cylindrical body.

2. A centrifugal separator for separating liquid droplets from a gas flow according to claim 1, characterized in that the hydraulic seal vanes are made in the form of vertical plates bent round a radius and in a direction of rotation of a main flow, with the vertical plates edges joined tightly together from the perforated central pipe side and spaced apart from the cylindrical body side.

3. A centrifugal separator for separating liquid droplets from a gas flow according to claim 1, characterized in that a flow straightener is installed downstream between the perforated central pipe and the axial gas flow outlet pipe.

4. A centrifugal separator for separating liquid droplets from a gas flow according to claim 1, further comprising a second separated liquid removal section located on an opposite end of the cylindrical body.

5. A centrifugal separator for separating liquid droplets from a gas flow according to claim 4, characterized in that the separated liquid removal section is equipped with a throttling device.

* * * * *